(12) United States Patent
Reime

(10) Patent No.: US 8,207,749 B2
(45) Date of Patent: Jun. 26, 2012

(54) METHOD FOR INDUCTIVE GENERATING OF AN ELECTRICAL MEASUREMENT SIGNAL AND RELATED SENSOR DEVICE

(76) Inventor: Gerd Reime, Buhl (DE)

( * ) Notice: Subject to any disclaimer, the term of this patent is extended or adjusted under 35 U.S.C. 154(b) by 403 days.

(21) Appl. No.: 12/690,960

(22) Filed: Jan. 21, 2010

(65) Prior Publication Data

US 2010/0181989 A1    Jul. 22, 2010

(30) Foreign Application Priority Data

Jan. 21, 2009 (DE) .......................... 10 2009 005 579
Feb. 16, 2009 (DE) .......................... 10 2009 009 061

(51) Int. Cl.
*G01R 27/28* (2006.01)
(52) U.S. Cl. ................. 324/654; 324/207.15; 73/514.16
(58) Field of Classification Search .................. 324/654, 324/207.15; 73/513.16
See application file for complete search history.

(56) References Cited

U.S. PATENT DOCUMENTS 6,571,631 B1 * 6/2003 Yamamoto ................. 73/514.17

FOREIGN PATENT DOCUMENTS

| DE | 3329515 C2 | 3/1985 |
|----|----|----|
| EP | 0706648 B1 | 4/1996 |
| EP | 0798502 B1 | 10/1997 |
| WO | 9320409 A1 | 10/1993 |
| WO | 2007006910 A1 | 1/2007 |
| WO | 2007012502 A1 | 2/2007 |

* cited by examiner

*Primary Examiner* — Vincent Q Nguyen
(74) *Attorney, Agent, or Firm* — Cantor Colburn LLP

(57) ABSTRACT

In a method and a sensor device for inductively producing an electrical measuring signal in dependence on a magnitude that is to be measured, there are provided at least two driver coils through which a current is caused to flow in turn at the clock pulse rate of a clock pulse circuit, this current induces a voltage which is dependent on the magnitude that is to be measured in a plurality of coils, the voltage being sub-divided at the clock pulse rate of the clock pulse circuit into voltage signals which are associated with the driver coils, where the voltage signals obtained thereby are evaluated for the purposes of obtaining the measuring signal, where at least two sensor coils are associated with the at least two driver coils, wherein either the sensor coils or the driver coils are connected up in the same sense, whereas the respective other coils are connected up in a mutually opposite sense, and the voltage signals of the sensor coil associated with the driver coils are sampled in certain time periods of the clock pulse signal for the purposes of obtaining the measuring signal.

15 Claims, 3 Drawing Sheets

METHOD FOR INDUCTIVE GENERATING OF AN ELECTRICAL MEASUREMENT SIGNAL AND RELATED SENSOR DEVICE

CROSS REFERENCE TO RELATED APPLICATIONS

The present application claims the priority of the German patent applications 10 2009 005 579.7, filed on 21 Jan. 2009, and 10 2009 009 061.4, filed on 16 Feb. 2009, the disclosure of both of which is hereby expressly incorporated by reference in their entirety.

FIELD OF THE INVENTION

The invention relates to a method for inductively producing an electrical measuring signal in dependence on a magnitude which is to be measured, such as for example, for determining the path and/or the position in space and/or the material properties of a test object which is to be detected in accordance with the preamble of Claim 1. Furthermore, the invention relates to a sensor device for carrying out this method in accordance with the preamble part of Claim 9.

BACKGROUND

A method and a device for measuring distances by means of inductive sensors is known from WO 2007/012502 A1. For the purposes of obtaining an electrical measuring signal, for example, as a consequence of a test object approaching an appropriate sensor, several driver coils are operated in clocked manner. The driver coils induce a voltage in a sensor coil at a clock rate of a clock pulse circuit, said signal becoming zero when the circuit is in a steady state. The voltage signals that have been obtained in this way are each divided at the clock rate of the clock pulse circuit into sections which are each associated with a driver coil, these sections being compared with one another so that an amplitude regulating process can be carried out. The difference in value between the voltage signals is used in the course of the amplitude regulating process in order to obtain, from the sections associated with the driver coils, equally large voltage signals that are devoid of clock synchronous components or differences at the inputs of a comparator. When in this steady state, a phase regulating process is additionally started in order to thereby obtain a further component of a measuring signal (e.g. for distinguishing between types of metal).

The principle underlying the amplitude regulating process being used therein is known per se from EP 706 648 B1. Here, light signals between light emitters and light receivers are captured, compensation being made for outside influences such as stray light, temperature or the effects of aging. The light emitters are operated alternately in time division manner using a clock pulse generator. The light that has been amplitude regulated in at least one light path acts on the light receiver, possibly together with the light from a further light emitter such as that from a compensating light source for example, in such a way that a received signal that is devoid of clock synchronous signal components then ensues. The received signal from the light receiver is supplied to a synchronous demodulator which then decomposes the received signal into signal components corresponding to the two sources of light. These are compared with one another in a comparator and a signal corresponding to a zero state is thereby produced. If a signal corresponding to this zero state is not present at the output of the comparator, then the radiating power being supplied to the sources of light is regulated until such time as this state is reached.

Inductive proximity switches are used for example, in order to determine the path or the position in space or the material properties of a test object. In practice thereby, the sensing distance of the proximity sensor is usually very small or different metals such as steel St37, paramagnetic metals such as aluminium or diamagnetic metals such as copper can only be identified with equal sensitivity using special circuit configurations. The solution of WO 2007/012502 A1 could itself contribute to an improvement, but it also requires a phase regulating process in addition to the amplitude regulating process.

DE 33 29 515 C2 discloses an electrical circuit configuration for a magnetic-inductive sensor and a corresponding sensor device for determining the position of a ferromagnetic object. The sensor device comprises several transmitter coils, a receiving device and a clock generator controlling the power supply of the transmitter coils, the recall of the measuring signals from the receiving device and the signal processing components. An electroconductive intermediate mass is arranged between the transmitter coils and the ferromagnetic object. The component recalling the measuring signals is connected to the receiving device only after stabilizing the eddy currents in the intermediate mass.

EP 0 798 502 B1 shows a position/displacement sensor for detecting a valve position. The sensor comprises an evaluation circuit for evaluating the length of a time window effected by a phase shift, an exclusive-or-member and a counter followed by a register, wherein the respective counting results can be read in. An inductive arrangement is provided to detect the valve piston, the arrangement comprising two coils arranged side by side in the direction of movement of the piston. The evaluating device serves for measuring the detuning caused by the change in position of the piston, wherein a phase shift of the AC voltage respectively measured relative to each other is evaluated as detuning WO 2007/006910 A1 makes known a method for inductive measurement of a relative movement or relative positioning of a first object relative to a second object. For this purpose, two transmitter coils and two receiver coils are provided wherein the transmitter coils are arranged on the first object and the receiver coils are arranged on the second object within a magnetic filed generated by the transmitter coils. The output signal of the receiving coil is used for determining the relative displacement of the objects. The objects to be monitored are parts of a telescope constituted by a plurality of mirror elements. For detecting the position thereof, the common inductivity of the coil arrangement is used and the voltages are measured which are induced in the receiver coils by the transformation effect. For this purpose, the voltage at the transmitting terminals is used, i.e. with a quasi-unlimited impedance.

WO 93/20409 A1 discloses a sensor drive and signal processing. A sensor is primary-side feeded by an oscillating input signal and detects the output signal of the sensor on the secondary side and amplifies it. The secondary side signal processing is digitally conducted. The sensor comprises a coil arrangement consisting of one input coil and two output coils and a core, whose position is detectable.

BRIEF SUMMARY

The invention provides a method and a sensor device for producing an electrical measuring signal inductively in such a manner that increased sensitivity respectively an increased sensing distance can be obtained in a compact structure.

Due to the use of a group consisting of at least two driver coils and a group consisting of at least two sensor coils, wherein the coils are connected up in the same sense in one of these groups for example and the coils are connected up in an opposite sense thereto in the other one of these groups, this results in a multiple of the previously usual sensing distance. In the starting state of the circuit, i.e. in the absence of test objects, the voltages on the sensor coils that have been induced therein are mutually cancelled. However, if the magnetic field between a driver coil and a sensor coil is affected by a test object, the voltage induced in the sensor coil is changed in such a way that the presence of the test object and/or certain properties thereof can be detected. To this end, the voltage signal on the sensor coils is sampled at certain respectively predetermined or predeterminable time points which are predefined by the clock pulse circuit. The sampling process can take place at various sampling time points. At one sampling time point for example, the changes in the maximum amplitude are detectable, whereas another sampling time point which is preferably displaced in phase by 90 degrees provides an indication of the phase shift. The test object can be identified with these items of information relating to the amplitude and the phase.

When sampling is taking place in the vicinity of the maximum amplitude, for example, when the further readjusting process is switched off in the steady state—whereby the voltage waveform shown in FIG. 2 becomes visible—the sensitivity of the system for the detection of arbitrary test objects is at a maximum, whereas at a sampling time point in the vicinity of the zero crossing point of the signals (i.e. phase shifted by approximately 90° relative to the maximum) the type of metal of the test object can be determined.

Preferably, the signals obtained are compared with one another, these signals having been broken down into time periods associated with the individual clock pulse periods as is known from EP 706 648 B1, although here, as a deviation therefrom in accordance with the invention, these clock pulse periods can amount to 1% to 10% of the overall clock period for example, and the difference value which has been derived in this manner is then used for regulating the power that is being supplied to the driver coils. This in turn has an effect on the voltage signals induced in the sensor coils so that the regulation process pursues the goal of having equally large voltages on the inputs of the comparator i.e. there will be no differential voltage from the various sensor coils thereon. In the event of a differential voltage being present, the difference value so obtained, and to that extent the regulating value too, is simultaneously a value for the location, the path and the position in space of the test object i.e. for the approach of the test object.

In one embodiment in which the sensor coils are connected up in opposite sense, compensation for extraneous magnetic fields is effected by virtue of the interconnection of the sensor coils. This process of compensating for extraneous magnetic fields permits high amplification of the voltage signals in the sensor coils so that even the smallest alterations in the change of the effect of the driver coil are perceptible, this thereby leading to test objects being detected at greater sensing distances.

In an embodiment wherein the driver coils are connected up in opposite sense and the sensor coils are connected up in the same sense, the possibility of compensating for extraneous magnetic fields by means of the interconnection of the sensor coils is no longer available.

Further advantages will be apparent from the following description and the subclaims.

BRIEF DESCRIPTION OF THE FIGURES

The invention is described in more detail hereinafter on the basis of exemplary embodiments which are illustrated in the Figures. Therein, the figures show.

DETAILED DESCRIPTION

Figure 1A:
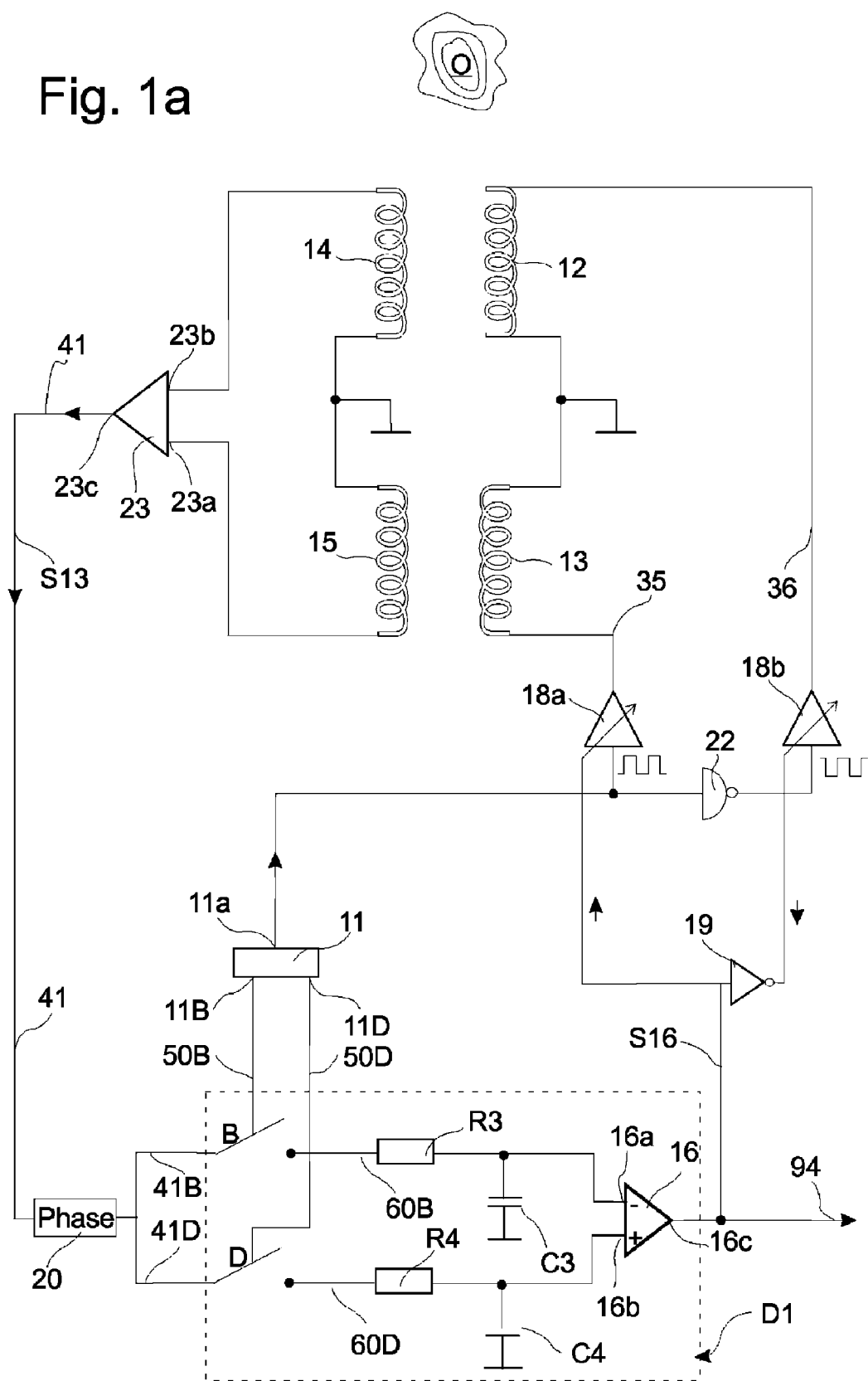
FIG. 1a a schematic circuit diagram of a first embodiment of a circuit in accordance with the invention for producing an electrical measuring signal inductively, FIG. 1b a schematic circuit diagram of a second embodiment of a circuit in accordance with the invention for producing an electrical measuring signal inductively, FIG. 2 the voltage signal from differing test objects and at differing sampling time points in the non-stabilised state, FIG. 3 the arrangement of the driver coils and sensor coils.

The invention will now be described in more detail in exemplarily manner with reference to the accompanying drawings. However, the embodiments are merely examples which are not intended to restrict the inventive concept to a certain arrangement. Before the invention is described in detail, it should be pointed out that it is not restricted to the particular components of the device and the particular method steps since these components and procedures may vary. The terms used here are only intended to describe particular embodiments and are not used in a limiting manner. In addition, if the singular or indefinite article is used in the description or in the Claims, this also relates to a plurality of these elements insofar as it is not unambiguously clear from the general context that something else is meant.

The Figures depict a sensor device for producing a measuring signal inductively in dependence on at least one of the magnitudes to be measured comprising such magnitudes as the path or the position in space or at least one material property of a test object O that is to be detected for example. For this purpose, one uses at least two driver coils 12, 13 through which a current is passed in turn at a clock pulse rate of a clock pulse circuit 11. The clock pulse circuit 11 emits a clocking signal at its output 11a, this signal being supplied via a driver directly to the coil 13 and via a driver and the inverter 22 to the coil 12. In principle, it is also conceivable for there to be more than two driver coils 12, 13 and more than two sensor coils 14, 15. The voltage in the driver coils 12, 13 induces a voltage in the sensor coils 14, 15 which is dependent on the magnitude that is to be measured and thus on the test object O. This voltage is applied to the inputs 23a, 23b of a preferably symmetrical amplifier 23. In correspondence with the voltage at the output 23c of the preferably symmetrical amplifier 23, the signal S13 is applied over the line 41 to the synchronous demodulator D1. In the steady state, the signal S13 merely consists of the amplifier noise of the amplifier 23 devoid of clock synchronous components. This means that the effect of the driver coils on the sensor coils is equal respectively that the driver coils have the same effect on the sensor coils.

Figure 1B:
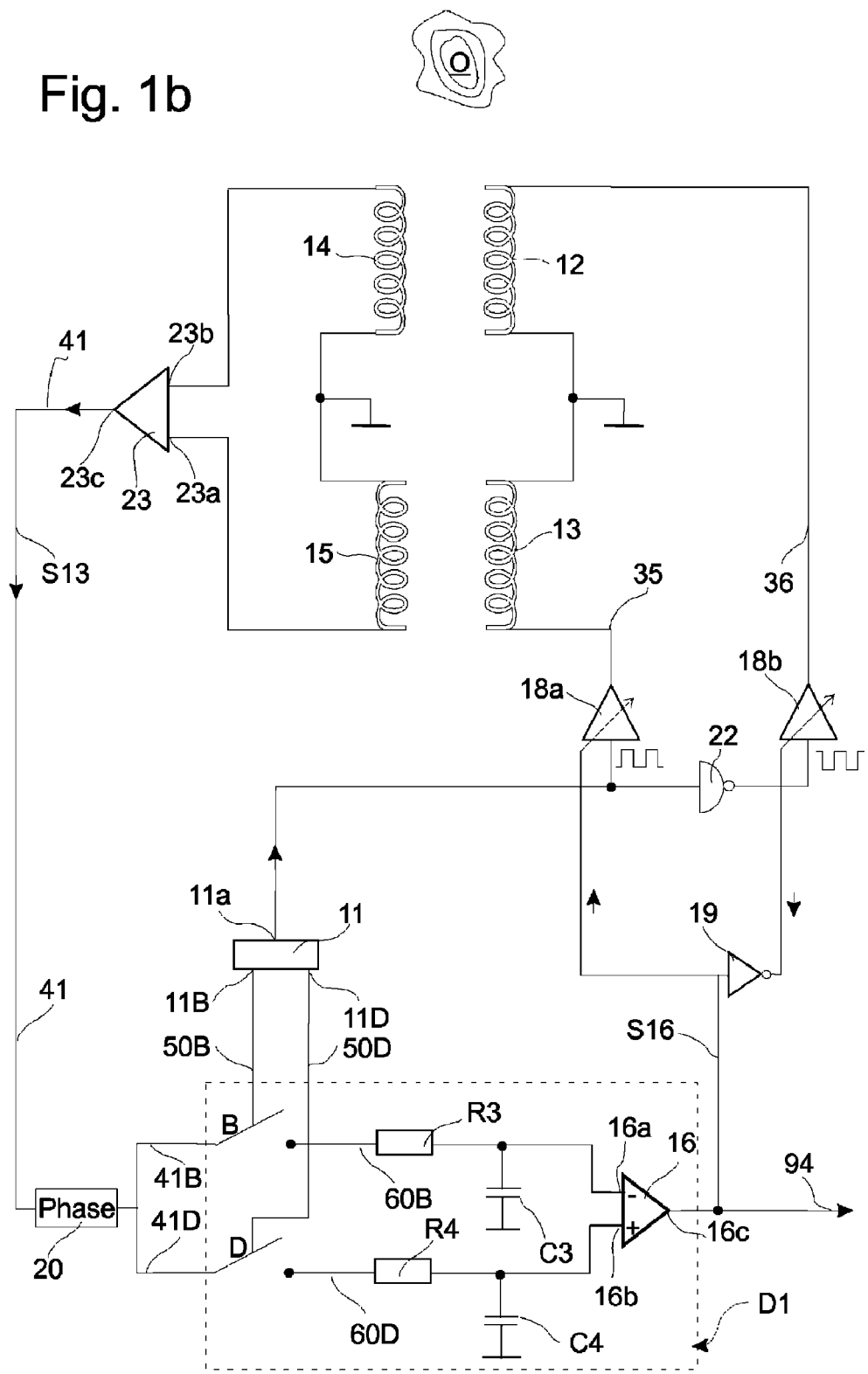
Figure 3:
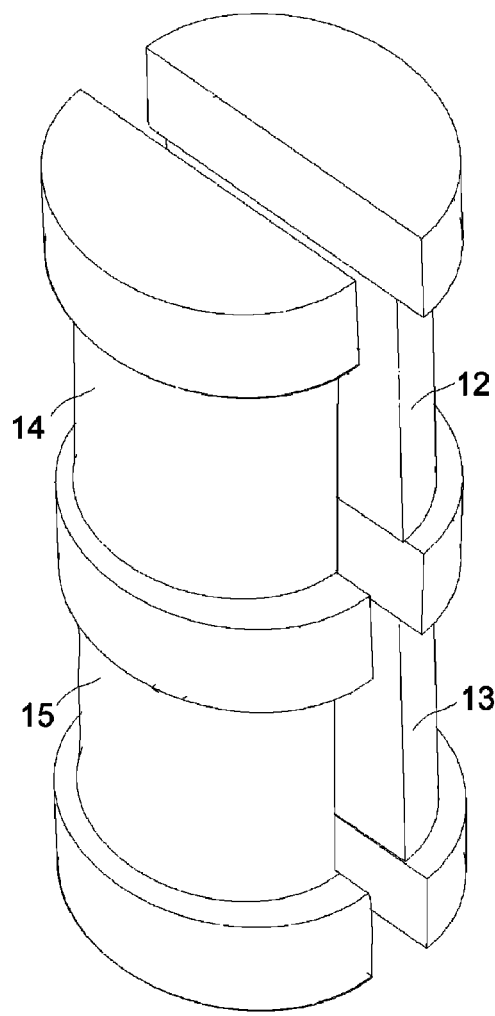

FIGS. 1a and 1b in combination with FIG. 3 show two driver coils 12, 13 as well as two sensor coils 14, 15. In the exemplary embodiments shown, the arrangement comprises semicircular spool bodies which are arranged such as to be spatially parallel to each other. For the sake of simplicity in FIG. 3, the windings (the driver coils 12, 13 and the sensor coils 14, 15) on the spool bodies within the regions thereof set back in relation to the outer periphery have been omitted. To this extent, the arrangement in accordance with FIG. 3 can be enclosed in a particularly simple manner in a housing, whereby a sensor with a, for example, closed sensor surface can be formed, and whereby the spool body can be provided with a surface consisting of synthetic material or metal. Other forms of coils rather than the ones having a semicircular form are possible.

In accordance with FIG. 1a, the sensor coils 14, 15 are connected in such a way that an extraneous magnetic field which acts on both respectively the at least two sensor coils 14, 15 produces spurious signals at the output 23c of the amplifier 23. By reversing the arrangement of one of the two sensor coils as shown in FIG. 1b, this will compensate for an extranous field so that spurious signals will not appear at the output 23c of the amplifier 23.

In principle however, any other coil arrangement, such as a parallel circuit of the coils for example, could be used as long as it can be ensured that no signal having clock synchronous components can appear at the output 23c of the amplifier 23 in the steady state.

The signal S13, which has been obtained in this manner and which can be attributed to the respective driver coils 12, 13 given a knowledge of the clock pulse rate of the clock pulse circuit 11, is sampled prior to the synchronous demodulator D1. For this purpose, the switches B, D are switched only for a time period that is short in proportion to the overall clock period. The synchronous demodulator D1 could also be of a different type e.g. it could be in the form of a 1 bit A/D converter. This solution is selected e.g. in an integrated circuit IC 909.05 obtainable from ELMOS Semiconductor AG. Since, in this IC the sampling time point is fixed in relation to the clock pulse phase (at about the centre of the clock pulse phase), a phase shifter 20 can be provided for differentiating between e.g. highest sensitivity and distinguishing the type of metal. In this case, sampling is effected e.g. firstly in the vicinity of the maximum change of amplitude (highest sensitivity) or within the range of maximum phase shift (distinguishing the type of metal). For the purposes of achieving equal sensitivity for all types of metal, one or more further sampling time points can also be selected. The phase shifter 20 can be dispensed with if the sampling time point is freely selectable.

In accordance with FIG. 3, the driver coils 12, 13 that are preferably located on a geometrical axis are arranged to be spatially parallel to the sensor coils 14, 15 which are also preferably located on one geometrical axis. However, other arrangements in which the coils are not arranged on one geometrical axis are also conceivable. In the embodiments shown, the number of driver coils 12, 13 corresponds to the number of sensor coils 14, 15, although different arrangements are conceivable insofar as the connection of the coils in the same and the counter directions is ensured so that clock synchronous components of the output signal are eliminated.

In the embodiments shown, the signal S13 coming from the sensor coils 14, 15 is transmitted to the synchronous demodulator D1 over the line 41 and the phase shifter 20. In dependence upon the manner in which the switches B and D are controlled over the control lines 50B and 50D from the outputs 11B and 11D of the clock pulse circuit 11, the voltage signal is transmitted to the inputs 16a, 16b of the comparator 16 via the lines 60B, 60D, the resistances R3, R4 and the condensers C3, C4 at the clock pulse rate of the clock pulse circuit 11. In the starting state, that is to say when no test object O is detected respectively present, the voltage signals at the inputs 16a, 16b of the comparator 16 of the same magnitude so that a certain regulating value, which leads to there being equal input values at the inputs 16a, 16b of the comparator 16, is present at the output 16c of the comparator 16. A high amplification factor operational amplifier can be used as the comparator for example. The regulating value is adjusted by means of an amplitude regulating arrangement formed by the amplitude regulators 18a, 18b in such a way that if the current rises in one driver coil then it decreases in the other driver coil. To this end, the regulating value is inverted by the inverter 19. However, a one-sided regulation process could also be provided. The regulating value 94 can be used for determining the approach of the test object. The power supplied to the driver coils can be regulated by the amplitude regulators 18a, 18b in such a way that the above-described state at the inputs 16a, 16B of the comparator 16 will again result. This principle is known from the EP 0 706 648 B1.

Figure 2:
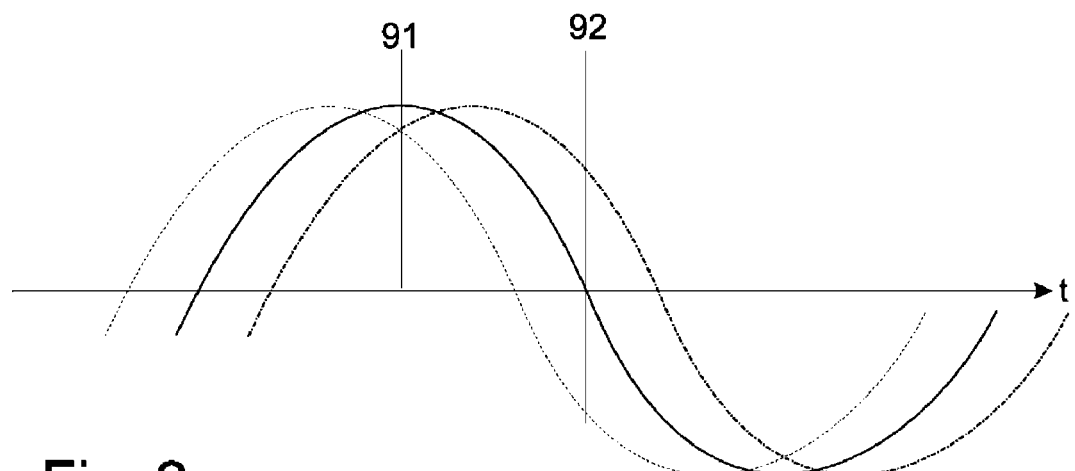

In an ideal arrangement, the voltage signal S13 in the starting state is merely in the form of the amplifier noise of the amplifier 23 without clock synchronous components. If a test object O approaches, then it has an effect upon the clock synchronous amplitude information in the voltage signal S13. If a test object O is located in the sensor-active range, this leads to a change in amplitude at the sampling time point. By suitable choice of the sampling time point (see above), one can, inter alia, distinguish between the types of metal of the test object for example, a possibly maximum sensitivity for certain types of metal or e.g. a factor 1 (the same sensitivity for all types of metal) or else a process for eliminating the type of metal can be achieved. Two sampling time points 91, 92 are illustrated in FIG. 2 for example, one of which depicts the case of maximum sensitivity and the other that of distinguishing between types of metal. By means of a phase shifting process, the sampling time point is located at the time point 91 on the one hand and at the time point 92 on the other, wherein the voltage signals illustrated in FIG. 2 are dependent on the particular type of metal, e.g. iron, copper, aluminium.

In accordance with the method, the current being supplied to the driver coils 12, 13 at the clock pulse rate of the clock pulse circuit induces a magnetic field in the sensor coils 14, 15 which is such that the voltage at the inputs of the amplifier 23 would cancel one another out. The driver coils are interconnected in the same sense and the sensor coils in the opposite sense thereto. However, it is only necessary that one group of two groups of coils comprising the driver coils, on the one hand, and the sensor coils, on the other hand, are perceived to be arranged in the same sense, while the other group is perceived to be arranged in the opposite sense thereto.

The process of sampling the voltage signals for determining the electrical measuring signal preferably takes place at different time points so that, by suitable choice of the sampling time point, the states specified above are detectable even if there are additional further states which supply wanted results depending upon the application. As described above, these four states comprise the maximum sensitivity for certain types of metal which is greater in the case of non-ferrous metals than it is for iron, the same sensitivity for all types of metal and distinguishing between the types of metal as well as the exclusion of certain types of metal. The principle in accordance with the invention thereby bolsters the sensitivity required for the detection process which thus results in an increased sensing distance. In practice, this has resulted in sensing distances of 20 mm in the case of sensors having 12 mm diameters utilising housings made entirely of metal and ferrite-free coils.

It is self evident that this description can be subjected to the most diverse kinds of modifications, changes and adaptations which can be considered as falling within the scope of equivalents to the appendant Claims.

The invention claimed is:

1. A method for inductively producing an electrical measuring signal in dependence on at least one of magnitudes to be measured which comprise the path or the position in space or at least one of material properties of a test object using at least two driver coils through which a current is caused to flow sequentially at a clock pulse rate of a clock pulse circuit, said current inducing a voltage which is dependent on the at least one magnitude to be measured in at least two sensor coils and which voltage is subdivided at the clock pulse rate of the clock pulse circuit into voltage signals that are associated with the driver coils, wherein the voltage signals obtained in this manner are evaluated so as to obtain the electrical measuring signal, wherein the at least two sensor coils are associated with the at least two driver coils, wherein either the sensor coils or the driver coils are operated in the same sense or connected up in the same sense, whereas the other respective coils, i.e. the driver coils or the sensor coils are operated in the mutually opposite sense or connected up in the mutually opposite sense, wherein the voltage signals of the sensor coils associated with the driver coils are sampled in certain time periods of the clock pulse signal for the purposes of obtaining the electrical measuring signal, and wherein the driver coils are operated in such a way that they have the same effect on the sensor coils.

2. A method in accordance with claim 1, wherein the current flowing through the driver coils is controlled in such a way that each driver coil has the same effect on the sensor coils.

3. A method in accordance with claim 1, wherein the driver coils are operated in such a way that the effect of the driver coils on the sensor coils is cancelled at an output of an amplifier.

4. A method in accordance with claim 1, wherein the driver coils and the sensor coils respectively located on one geometrical axis are arranged spatially parallel to each other.

5. A method in accordance with claim 1, wherein the sensor coils are connected up in the same sense and the driver coils are connected up in a mutually opposite sense.

6. A method in accordance with claim 1, wherein the sensor coils are connected together in such a way that an extraneous magnetic field effective upon the at least two sensor coils will not produce a voltage at an output of an amplifier arranged downstream of the sensor coils.

7. A method in accordance with claim 1, wherein the number of driver coils corresponds to the number of sensor coils.

8. A method in accordance with claim 1, comprising the steps comparing the voltage signals associated with the driver coils in a clocked manner for the purposes of determining a regulating value at the output of a comparator, and using the regulating value for the purposes of regulating the amplitude of the power being supplied to the driver coils so that the amplitude of the voltage signals at the inputs of the comparator are equally large.

9. A sensor device for producing an electrical measuring signal inductively in dependence on a magnitude to be measured for the purposes of determining at least one of magnitudes comprising the path or the position in space or at least one of material properties of a test object, including at least two driver coils, a clock pulse circuit for sequentially at a clock pulse rate activating the driver coils with a current, at least two sensor coils which are associated with the driver coils and in which a voltage dependent on at least one of the magnitudes to be measured is induced by the current flowing through the driver coil at the clock pulse rate of the clock pulse circuit, an electronic component for subdividing the induced voltage into voltage signals associated with the driver coils at the clock pulse rate of the clock pulse circuit, a sampling device for sampling the voltage signals of the sensor coils associated with the driver coils for the purposes of obtaining the electrical measuring signal in certain time periods of the clock pulse signal, wherein the driver coils are arranged in such a manner that the effect of the driver coils on the sensor coils is equal.

10. A sensor device in accordance with claim 9, wherein the driver coils are arranged in such a way that the effect of the driver coils on the sensor coils is cancelled at an output of an amplifier.

11. A sensor device in accordance with claim 9, wherein the driver coils and the sensor coils which are located on one respective geometrical axis are arranged such as to be spatially mutually parallel.

12. A sensor device in accordance with claim 9, wherein the sensor coils are connected up in the same sense and the driver coils are connected up in a mutually opposite sense.

13. A sensor device in accordance with claim 9, wherein the sensor coils are arranged in such a way that an extraneous magnetic field which is effective on the at least two sensor coils does not produce a voltage at an output of an amplifier located downstream of the sensor coils.

14. A sensor device in accordance with claim 9, wherein the number of driver coils corresponds to the number of sensor coils.

15. A sensor device in accordance with claim 9, wherein there is provided a comparator for comparing the voltage signals associated with the driver coils for the purposes of determining a regulating value, and in that there is provided an amplitude regulator in which the regulating value for regulating the amplitude of the current supplied to the driver coils is regulated in such a way that the amplitude of the voltage signals at the inputs of the comparator are equally large.

* * * * *